United States Patent Office 3,230,125
Patented Jan. 18, 1966

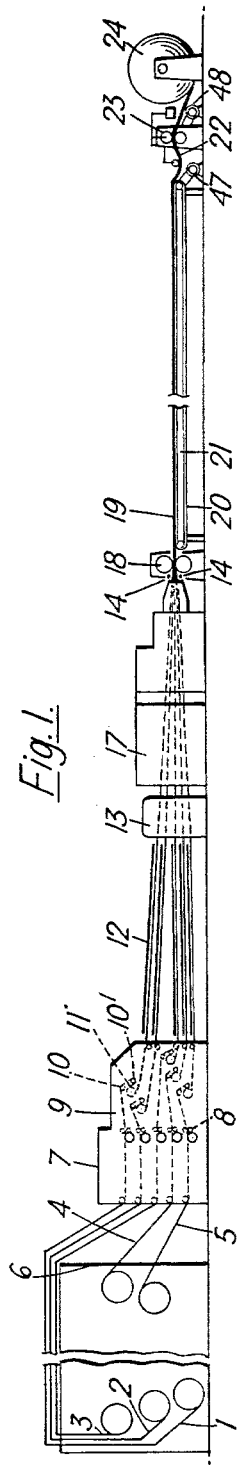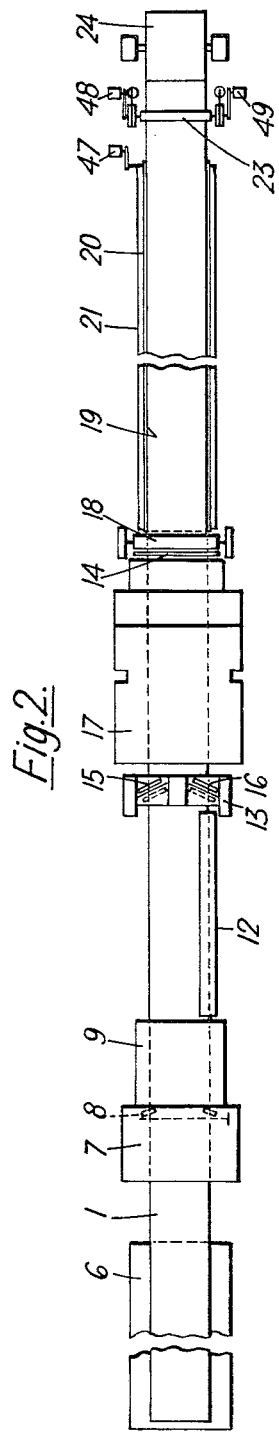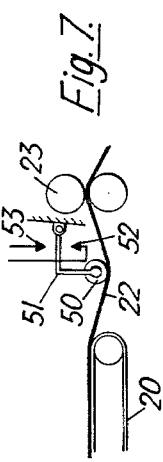

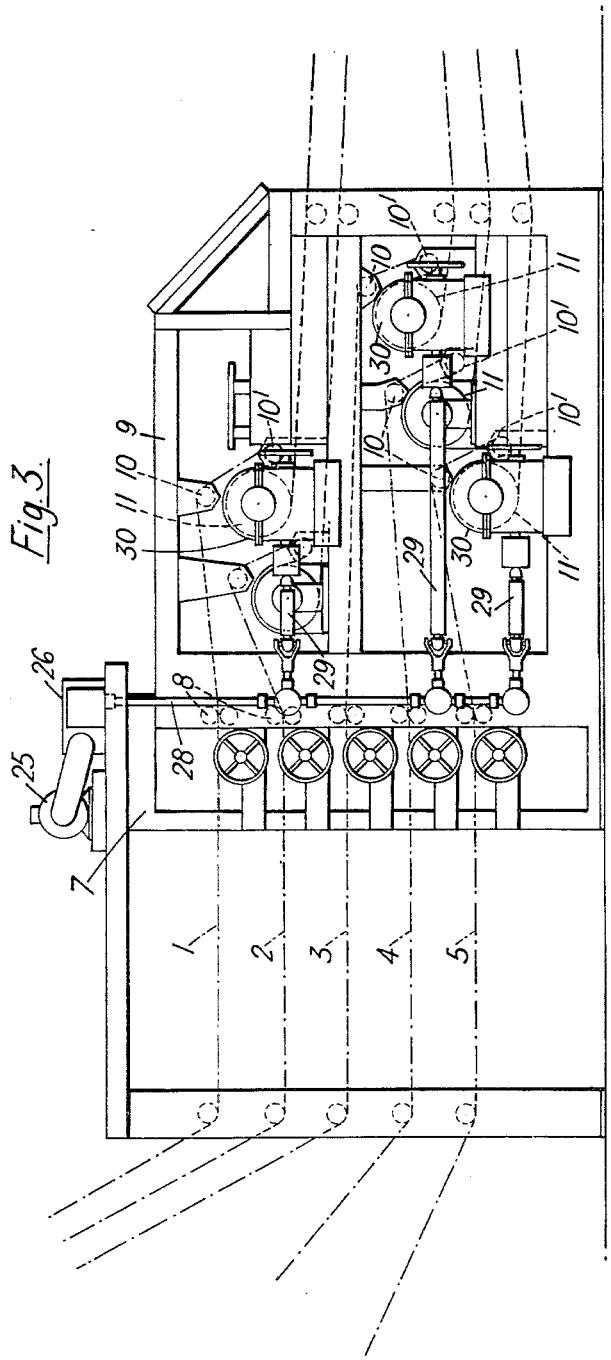

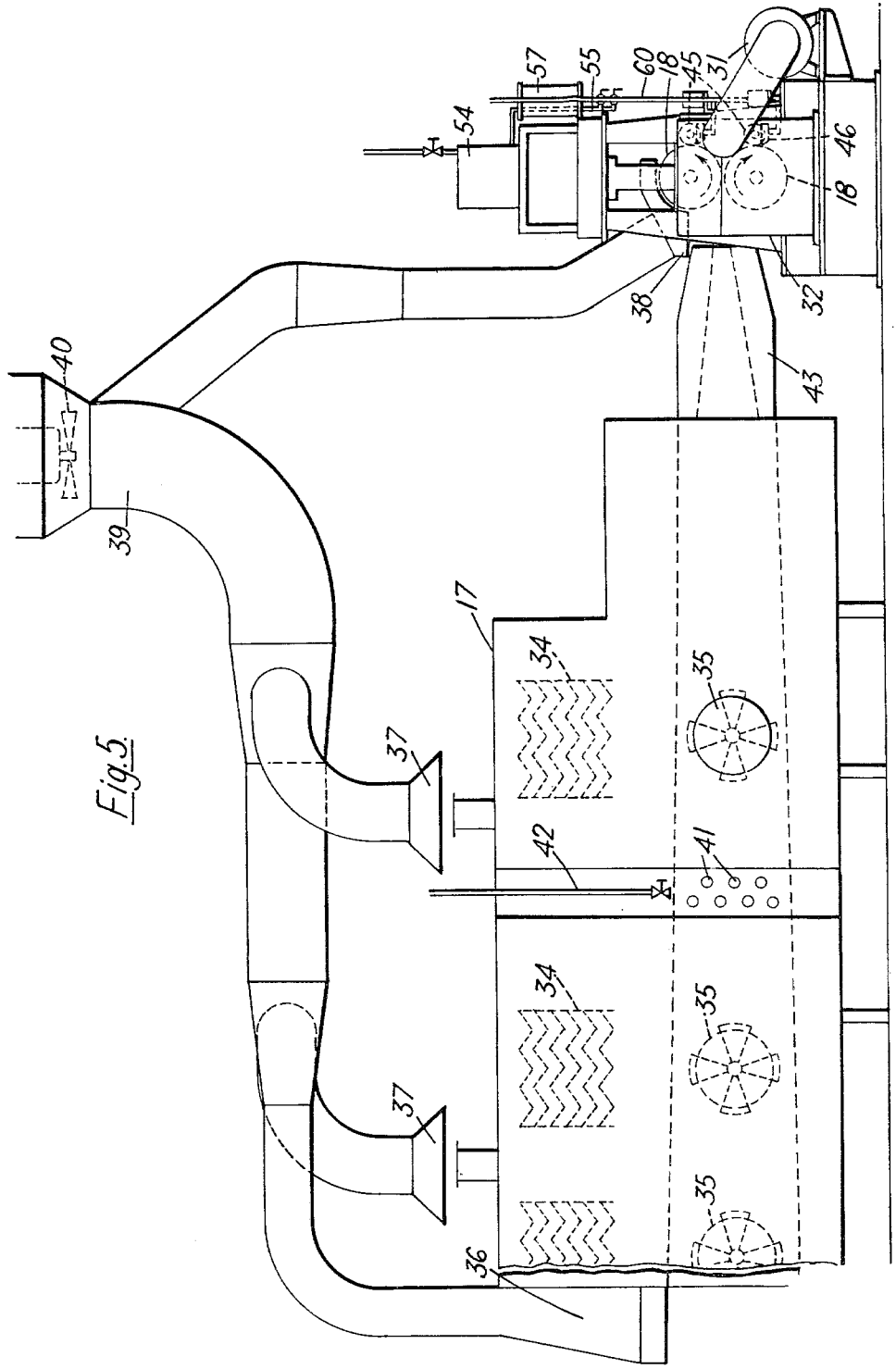

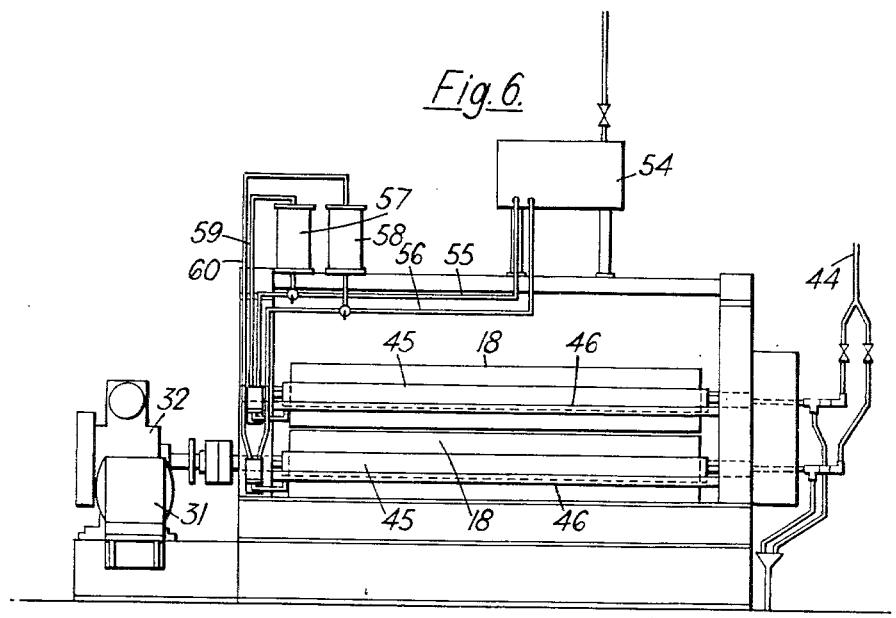
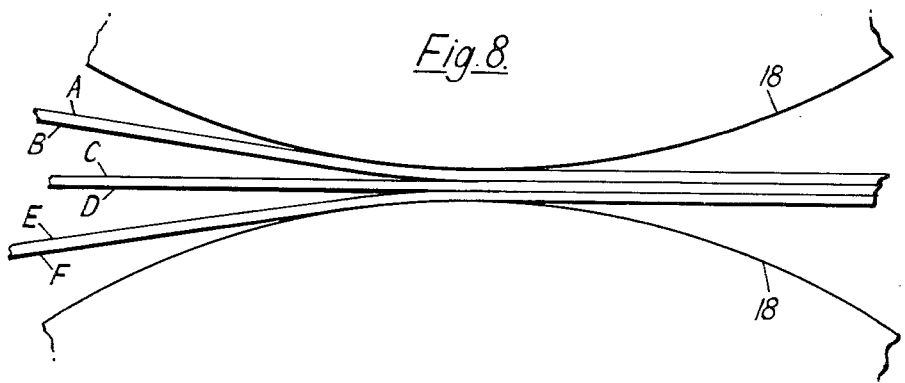

3,230,125
METHOD AND APPARATUS FOR MAKING LAMINATED CONVEYOR BELTING
Alfred Charles Hicks, deceased, late of Rochdale, England, by Edward Charles Hicks, executor, Manchester, England, assignor to Turner Brothers Asbestos Company Limited, Manchester, England
Filed Feb. 12, 1963, Ser. No. 258,381
Claims priority, application Great Britain, July 25, 1958, 24,049/58
10 Claims. (Cl. 156—229)

This application is a continuation-in-part of application Serial No. 829,052 filed July 23, 1959, now abandoned.

This invention relates to the manufacture of conveyor belting from fabric plies bonded by polyvinyl chloride. The production of such belting involves a number of problems which do not arise with other laminated materials. Thus it is necessary to heat the plies to a temperature at which they will bond or weld together, and the temperature range for satisfactory welding is very narrow. Plasticiser in the polyvinyl chloride tends to volatilize when heated. Stresses can easily be set up in the plies with consequential irregularities in the belt. The polyvinyl chloride tends to adhere to heated metal surfaces. All these factors give rise to difficulty.

It is an object of this invention to provide an improved method in which the body or carcase of conveyor belting can be produced continuously.

It is a further object to provide novel and useful apparatus for use in the production of conveyor belting.

In the conventional methods of making such belting an assembly of plies impregnated with polyvinyl chloride is subjected to heat and pressure either in a flat press or a continuous rotary press. It is found in practice that undesirable stresses are very easily set up in these presses. The present invention is based on heating of the plies to welding temperature followed by the passage of the plies through the nip between calender rolls to subject them to pressure and cause them to weld together. It is found possible in this way to avoid the main defect of belting produced by conventional methods, namely irregularities produced by stresses in the plies.

The invention will be explained with reference to the annexed drawings, in which:

FIGURE 1 is a diagrammatic elevation, and FIGURE 2 the corresponding plan, of a plant for producing five-ply belting;

FIGURE 3 is an elevation on a larger scale of an apparatus, forming part of the plant, for releasing plies under tension;

FIGURE 5 shows a heating chamber and calender rolls;

FIGURE 6 is an end view of the rolls shown in FIGURE 5;

FIGURE 7 is a diagrammatic view of means for removing the product from a conveyor on which it is carried; and FIGURE 8 is a diagram to illustrate the different speeds of plies passing through a roller nip.

Figure 4:
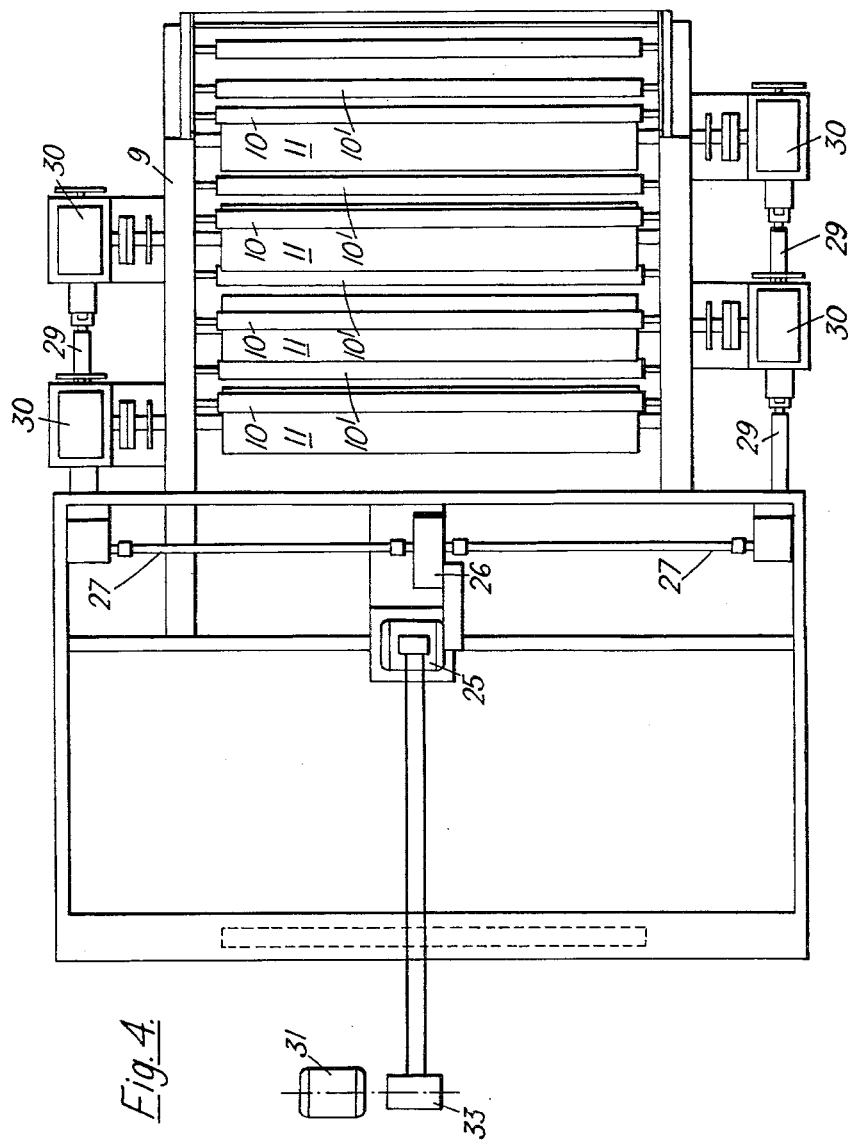
FIGURE 4 is a plan corresponding to FIGURE 3.

In the plant shown in FIGURES 1 and 2 five cotton fabric plies 1, 2, 3, 4 and 5, each impregnated with polyvinyl chloride, are formed into a welded assembly which forms the body or carcase of conveyor belting. The plies, coiled up, are mounted in a creel 6 and unrolled from it to pass through a frame 7 in which path-straightening rolls 8 are mounted, these rolls serving to direct each ply into or nearly into the desired path in a manner well known in the art. Next the plies pass through a frame 9 in which each ply passes round guide rolls 10 and 10' and a positively driven cylinder 11.

The plies pass onwards between and through means for guiding the plies so that they come into exact register with one another. These guiding means include five flexible metal strips 12 and a guiding machine 13, constructed and arranged to operate as described in detail in the application of Hicks et al., Serial No. 223,782, filed September 14, 1962. It is enough here to say that there is a continuous electrical conductor in the selvedge of each ply, and each strip 12 cooperates with the conductor in a ply to form a capacitor arranged in an electric circuit; use is made of current flowing in the circuit to influence a sensing device 14; and a signal given by the sensing device causes one or another of two pairs of correcting rolls 15 and 16 for each ply to operate, each pair when operating tending to move the fabric outwards from the centre line.

From the guiding machine 13 the plies enter a heating chamber 17 in which they are maintained out of contact with one another, and from which they pass to calender or nip rolls 18 by which they are formed into an assembly 19 and are united by the welding together of the polyvinyl chloride coatings. From the rolls 18 the welded assembly passes onto a belt conveyor 20 by which it is carried over a long flat metal table 21, cooling during this movement. On leaving the conveyor 20 the assembly forms a loop 22 and then is nipped between take-up rolls 23 and passed by them to a reel on which it is formed into a coil 24.

In order to produce a satisfactory conveyor belt the stresses in the bonded plies must be uniform. The cotton plies are obtained as articles of commerce and may have been woven by different weavers on different looms under slightly different conditions. If they are not subjected to tension prior to consolidation, it is not possible to ensure equal distribution of load-carrying capacity over the several plies in the final belt.

Moreover it is essential to maintain the plies out of contact with one another during the heating, and for this purpose also the length of each ply that is being heated must be under tension. This tension is set up between the frame 9 and the calender rolls 18. Now a difficulty arises when several plies of material, all under equal tension, are passed through a pair of calender rolls such as those shown at 18, this being illustrated by FIGURE 8. Assuming that the two rolls are each of 12 inches diameter, their circumferential length is 37.699 inches. FIGURE 8 shows three plies with surfaces A and B, C and D and E and F respectively. If the average ply thickness is 0.07 inch the surfaces A and F will travel at a speed equal to 37.699 inches per revolution, but the surfaces B, C, D and E will travel at a speed equal to 38.14 inches per revolution. The mean speed of each of the two outer plies will therefore be 37.92 inches, but that of the middle ply will be 38.14 inches. The result is that in the resultant assembly there is more material in the middle ply over each unit of length than in the two outer plies. This shows itself as ripples and the resultant belt is not satisfactory.

In the invention each guide roll 10 in the frame 9 is arranged beyond the corresponding cylinder 11 and the guide roll 10' is below the guide roll 10 so that a ply after passing round the rolls 10 and 10' must travel upwards to lap round the cylinder 11 with so large an angle of contact as to prevent slip between the ply and the cylinder. All the cylinders 11 are positively driven at the same surface speed. It follows that the length of each ply fed forward in unit time, which may most conveniently be regarded as that required for one revolution of each of the rolls 18, is the same. This length is made less than the circumferential length of each roll 18. Conveniently it may be 98% of that length, but this figure may be varied between, say, 95% and 99% in accordance with the physical characteristics of the plies. The result is that the two outer plies are stretched in travelling from the frame 9 to the rolls 18 to the extent of the difference in length (2 % in the 98% example), this stretching providing the minimum tension required to maintain the outer plies out of contact with the neighbouring plies during the heating. The tension in each inner ply will become that appropriate to the distance of the ply from the axis of each of the rolls 18 at the moment that it passes through the nip between the rolls 18. The plies will thus be subjected to unequal tension before passing through the nip but in the resultant assembly there will be an equal amount of each ply in each unit length of the assembly.

As an illustration, each ply may be 68 inches wide and subjected to a tension of at least 6 lbs. per inch width in its passage through the heating chamber.

To ensure that the cylinders 11 rotate at the desired speed, each is driven by a motor 25 through a gear box 26, a transverse shaft 27, vertical shafts 28 geared to the shaft 27, horizontal shafts 29 geared to the vertical shafts 28, and a gear box 30, there being one box 30 to each cylinder 11. The motor 25 is electrically interlocked with a motor 31 which drives the calender rolls 18 through a gear box 32. The motor 31 drives an electrical generator 33 which provides the necessary current for the motor 25, so that the two motors are always driven in step.

It is essential to heat each ply thoroughly and not merely on the surface. The temperature range within which successful bonding will take place is very small and it is not in practice possible to control accurately and consistently the temperature of the polyvinyl chloride merely, for example, by subjecting the surface to radiant heat or by passing it in contact with a heated surface. Such methods of heating result either in excessive loss of plasticiser and charring caused by overheating or in failure of the plies to adhere. Moreover, if heated rolls were used the polyvinyl chloride would adhere to them. The thorough heating required is provided in the invention by passing the plies through a hot zone, namely the interior of the heating chamber 17. This heating chamber is shown in more detail in FIGURE 5, and in it the heat is supplied by electrical heaters 34 which heat the air, which is circulated through the chamber by three fans 35. During the heating fumes are evolved, and are collected by a hood 36 at the feed end of the chamber, two hoods 37 over openings in the chamber and a hood 38 at the discharge end. These hoods all lead to a discharge pipe 39 containing an extractor fan 40.

The plies in passing through the chamber are supported by rollers 41, these rollers being provided primarily to reduce the tension necessary to maintain the plies out of contact with one another and being water-cooled by water supplied through a pipe 42.

The temperature in the chamber 17 is maintained within the range of 200 to 210° C., and preferably at about 205° C. The plies may travel at, for instance, 4 feet per minute, and they should spend about 4½ minutes in the chamber 17 to ensure that they reach the desired temperature.

If the plies were first brought together and subsequently heated it would be extremely difficult to bring the inner plies to the right temperature without overheating the outer plies.

At the outlet end of the chamber 17 there is an outlet hood 43 intended to ensure that the plies remain at the desired temperature to which they have been raised in the chamber 17 until they enter the nip between the calender rolls 18. The plies come into contact with one another and thus form the assembly 19 just before the nip, and by their passage through the nip while they are hot they become welded together.

It is important to prevent the outermost plies from sticking to the rolls 18, and for this purpose the rolls must be cooled and also externally damped. The rolls are internally water-cooled in the conventional way, cooling water being supplied for this purpose through a branched pipe 44. They are externally damped, and also additionally cooled, by causing each roll 18 to make contact with a damping roll 45. Each damping roll is mounted to rotate freely in a trough 46 to which water containing a small proportion of a wetting agent is fed from a tank 54. From this tank pipes 55 and 56 run to feeders 57 and 58, the feeder 57 supplying the upper trough 46 through a pipe 59 and the feeder 58 supplying the lower trough 46 through a pipe 60. Each damping roll 45 turns by frictional engagement with the corresponding roll 18, picks up water in the trough 46 and transfers it to the roll 18, so that there is always a film of water and wetting agent on each roll 18 when the one or other outer surface of the assembly comes into contact with it. Steam produced from these films is drawn away through the hood 38.

The nip between the rolls 18 is at the same height as the upper run of the conveyor 20, and the assembly 19 passes from the nip onto the belt. It cools on the belt 20 and remains flat on it until the polyvinyl chloride has set. In the example given, this time may be, say, 8 minutes.

On leaving the calender rolls 18 the assembly 19 ceases to be under pressure. Hitherto it has commonly been supposed that it must be maintained under pressure during cooling in order to prevent the plies separating from one another under the action of gases evolved from the bonding agent. It is found that not only is there no need for such pressure but also that it actually is undesirable. If pressure is exerted uneven stresses in the plies may be "frozen into" the product. By allowing the assembly to cool while flat this undesirable possibility is substantially eliminated.

The ideal is to free the assembly from all external forces while it cools, and ideally the assembly should be devoid of compressive or tensile stresses while it rests on and is carried by the conveyor 20. It is, however, very difficult in practice to ensure that the hot consolidated assembly comes from the rolls 18 at exactly the same speed as the conveyor, and it is particularly important that it should not be subjected to any retarding forces. For this reason the conveyor 20 is driven by a motor 47 at a surface speed slightly greater than that of the assembly as this emerges from the calender rolls. The difference may be such that the surface speed of the conveyor is about 1% greater than that of the assembly as it arrives at the conveyor, and although this difference may set up some very slight tension indeed in the assembly and produce slight slip between the assembly and conveyor it is found that the harmful effect is negligible.

The speed of movement of the assembly at the instant of leaving the conveyor 20 will be substantially the same as that on leaving the rolls 18. The take-up rolls 23 are loaded to grip the assembly firmly, and in order to accommodate any difference between the speed of the assembly and the surface speed of each of the rolls 23 the loop 22 is allowed to form. The rolls 23 are driven alternately by one or other of the two constant-speed motors 48 and 49, the motor 48, when driven, driving the rolls 23 at a surface speed slightly faster than that of the assembly and the motor 49, when driven, driving them at a surface speed slightly slower than that of the assembly. The loop 22 is engaged by a roller 50 mounted on one end of an arm 51, which moves between two limit switches 52 and 53, which control the motors 48 and 49 respectively. If the loop 23 deepens, indicating the need for increased take-up speed, the lever 51 engages the switch 52 to cause the motor 48 to rotate, and as the switch is disengaged the motor 49 stops. When the loop has been taken up to a predetermined extent, the switches are reversed and the motor 49 drives the rolls 23.

It will be appreciated that accurate control of the speed of movement of the plies and assembly through the plant is important. The speed of the assembly through the nip between the rolls 18 is the controlling speed, and taking this as 100 the speed at which the plies are released by the cylinders 11 in the frame 9 may be 98, the speed of the conveyor 20 may be 101 and the speeds at which the cooled assembly is passed through the take-up rolls 23 may be 99 when the motor 49 is driving, and 101 when the motor 48 is driving.

The whole plant is relatively cheap both to make and to operate. In the product, there is no tendency for the plies to separate. One reason for this is the use of water (as described above) as a parting agent between the calendar rolls and the plies in contact with them, so that there is little resistance to the separation of these plies and the rolls.

The body or carcase produced by the process is converted into a belt by the addition of covers and side strips.

What is claimed is:

1. In the manufacture of conveyor belting comprising a plurality of fabric plies bonded together by polyvinyl chloride along meeting faces, the steps which comprise simultaneously uncoiling fabric plies impregnated with polyvinyl chloride from the coils thereof, applying to each ply a positive forward feeding force and in so doing setting up tension in a length thereof, heating the plies while under said tension and out of contact with each other to a temperature sufficient for the plies to weld together when pressed into contact with each other, forming the plies while still at said welding temperature into an assembly and calendering said assembly between calendering surfaces to consolidate it, cooling said calendering surfaces, applying a parting liquid to the outside of each outer ply and the calendering surface with which it makes contact, passing the resultant consolidated assembly immediately after calendering onto a travelling surface, and conveying said assembly in a flat condition on said traveling surface without exerting pressure on the assembly until the assembly is cool, the positive feeding force being applied to the plies between the coils and the point at which the plies are formed into an assembly.

2. A method as claimed in claim 1 wherein the heating is performed by leading the impregnated plies out of contact with one another through a heating chamber wherein they are heated to a temperature high enough to allow the polyvinyl chloride impregnated plies to weld together, and bringing these plies into contact with one another at a point outside the heating chamber at which they reach the calendering surfaces.

3. A method as claimed in claim 1 wherein the tension is set up in the length of each ply by feeding each ply to the heating zone at a positive controlled speed less than that at which the assembly is passed between the calendering surfaces.

4. A method as claimed in claim 1 in which the speed of the flat travelling surface is slightly greater than that at which the assembly passes between the calendering surfaces.

5. In the manufacture of conveyor belting comprising a plurality of fabric plies bonded together by polyvinyl chloride along meeting faces, the steps which comprise simultaneously uncoiling fabric plies impregnated with polyvinyl chloride from coils thereof, applying to each ply a positive forward feeding force at the same controlled speed, maintaining the plies fed from the coils spaced apart from one another while feeding them through a heating zone and there heating them to a temperature sufficient for the plies to weld together when pressed into contact with each other, bringing the heated plies into contact with one another outside said zone to form an assembly, and subjecting said assembly to pressure between rotary cylindrical surfaces, said cylindrical surfaces rotating at a surface speed greater than said controlled feeding speed said cylindrical surfaces driving said assembly between them at their surface speed, the positive feeding force being applied to the plies between the coils and the point at which the plies are formed into an assembly 6. In an apparatus for use in the manufacture of conveyor belting, the combination of a heating chamber, means for holding a plurality of coils of plies, means for passing plies from said coils through said chamber, said means including a plurality of ply-feeding devices operative to apply positive feeding pressure to all the plies and to feed the plies spaced apart from one another into said chamber, and a pair of calender rolls receiving all said plies as an assembly at the outlet end of said chamber, means for driving said ply-feeding devices to feed all said plies at a controlled speed, and means operatively connected with said driving means for driving said calender rolls at a surface speed greater than said controlled feeding speed, said ply-feeding devices being located between said coil holding means and said calender rolls.

7. In an apparatus for use in the manufacture of conveyor belting, the combination of a plurality of cylinders mounted to rotate about parallel axes, means for holding a plurality of coils of plies, means for guiding a fabric ply from each coil round and in frictional engagement with each of said cylinders, a pair of calender rolls for receiving and assembling the plies and consolidating the assembled plies, a heating chamber surrounding the path of travel of said plies between the cylinders and the calender rolls, means for driving the calender rolls at a controlled surface speed to cause the plies to travel through the heating chamber, and means for driving each cylinder at a surface speed less than that of the calender rolls, whereby to maintain each ply under tension in its travel through the heating chamber, said cylinders being located between the coil holding means and the calender rolls.

8. A combination as claimed in claim 7 wherein the means for driving the cylinders are driven by the means for driving the calender rolls.

9. A combination as claimed in claim 7 wherein the means for driving the calender rolls and the means for driving the cylinders each comprise an electric motor, and the two motors are electrically interlocked.

10. An apparatus for use in the manufacture of conveyor belting comprising a creel for coils of impregnated fabrics to be unwound to form plies, a heating chamber, means for passing said plies through said heating chamber out of contact with one another, a pair of calender rolls for receiving and assembling the plies from the heating chamber and consolidating the assembled plies, means for applying a parting liquid between the surface of each outermost ply and the corresponding calender roll, an endless conveyor adjacent the outlet side of the calender rolls for receiving the assembly of calendered plies, and means for driving said feeding means, calender rolls and conveyor at predetermined interrelated speeds.

References Cited by the Examiner

UNITED STATES PATENTS

| 1,787,404 | 12/1930 | Taylor et al. | |
| 1,929,839 | 10/1933 | Dawson | 156—495 XR |
| 2,451,597 | 10/1948 | Wheeler. | |
| 3,042,568 | 7/1962 | Ludowici et al. | 156—543 XR |
| 3,053,310 | 9/1962 | Spooner | 156—543 XR |

FOREIGN PATENTS 764,187   12/1956   Great Britain.

EARL M. BERGERT, *Primary Examiner.*